United States Patent [19]
Holcombe

[11] 3,950,860
[45] Apr. 20, 1976

[54] BUILDING BLOCK LAYING LEVEL INDICATING DEVICE

[76] Inventor: Richard L. Holcombe, 202 Center St. P.O. Box 247, Dushore, Pa. 18614

[22] Filed: Mar. 21, 1975

[21] Appl. No.: 560,722

Related U.S. Application Data

[63] Continuation-in-part of Ser. No. 505,275, Sept. 12, 1974, abandoned, which is a continuation-in-part of Ser. No. 408,564, Oct. 23, 1973, abandoned.

[52] U.S. Cl. .................................. 33/371; 33/89; 33/390
[51] Int. Cl.² ........................................ G01C 9/28
[58] Field of Search ............ 33/85, 86, 88, 89, 334, 33/339, 340, 343, 347, 370–373, 390; 248/364; 40/125 H

[56] References Cited
UNITED STATES PATENTS
613,946   11/1898   Starrett .................................. 33/89
2,689,412   9/1954   Young .............................. 33/371 X Primary Examiner—Richard E. Aegerter
Assistant Examiner—Charles E. Phillips
Attorney, Agent, or Firm—Witherspoon and Lane

[57] ABSTRACT

A building block laying level indicating device adapted for use with a building block of general rectangular configuration wherein the block has a top and a bottom, front and rear walls and end faces. The front and rear walls of the block are connected by webs spaced from each other to provide a plurality of holes extending from the top through the bottom. The device has a planar base with three support members mounted thereon which are adapted to rest on the top of the block. A level indicating means is mounted on the base for visually indicating the level condition of the block. A positioning member is affixed to the planar base and extends downwardly therefrom so as to maintain the level in operating position when placed on the building block.

7 Claims, 6 Drawing Figures

BUILDING BLOCK LAYING LEVEL INDICATING DEVICE

This application is a continuation-in-part of Application Ser. No. 505,275, filed Sept. 12, 1974, entitled "Level Holder," which in turn is a continuation-in-part of application Ser. No. 408,564, filed Oct. 23, 1973, both applications now abandoned.

SUMMARY OF THE INVENTION

This invention relates to a building block laying level indicating device adapted to rest on the block as it is laid to indicate when the block is level on the wall.

It is customary in laying blocks to use a plumb rule to ascertain the level alignment of the block which is being positioned on the wall. It would be an advantage to be able to place a level indicating device on the block so that it will remain there during the laying operation since it is necessary to hold the block with both hands in the laying of the block. With such an arrangement it can be readily ascertained whether or not the block is being positioned properly as it is lowered into position on the wall as it is held by both hands of the block layer.

In view of the above, it is an object of this invention to provide a building block laying level indicating device which may be readily placed on the block and will remain there throughout the laying operation.

It is another object of this invention to provide a building block laying level indicating device which may be applied to the block when it is in an upright position and will remain thereon when the block is moved to a horizontal position as in laying.

The above and other objects and advantages will become more apparent when taken in conjuction with the following detailed description and drawings.

IN THE DRAWINGS

Figure 3:
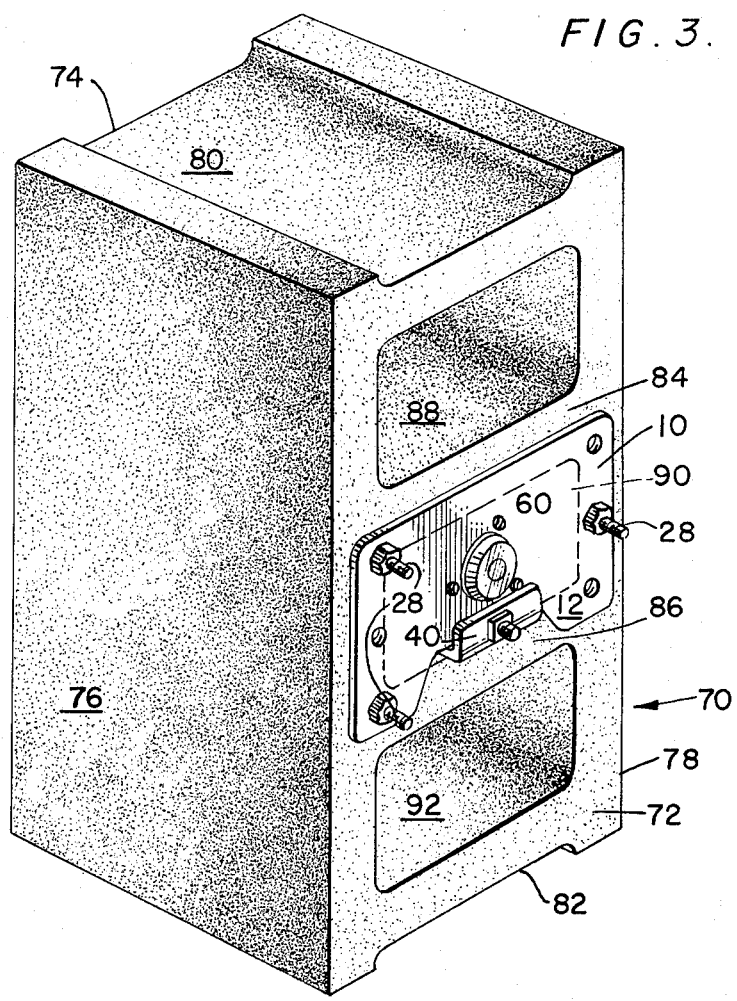
Figure 4:
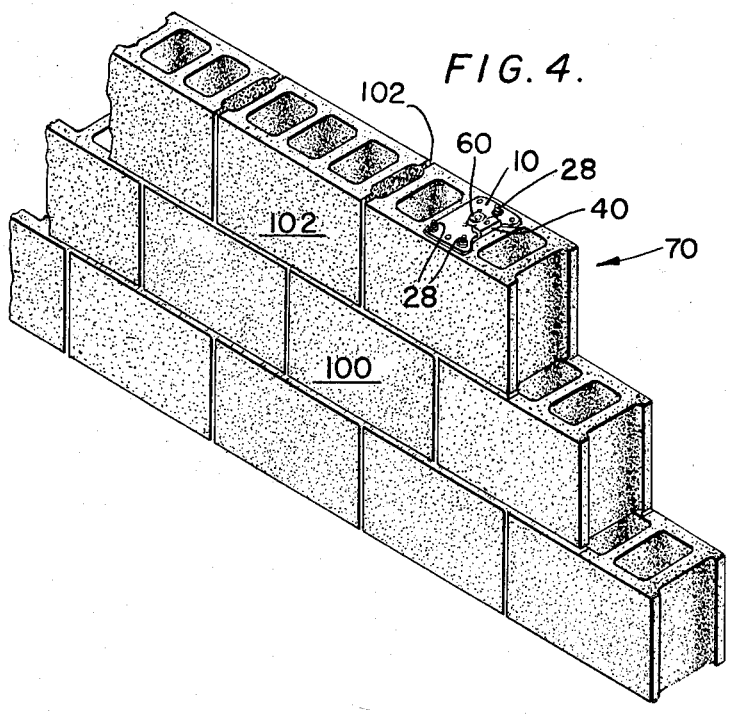
Figure 5:
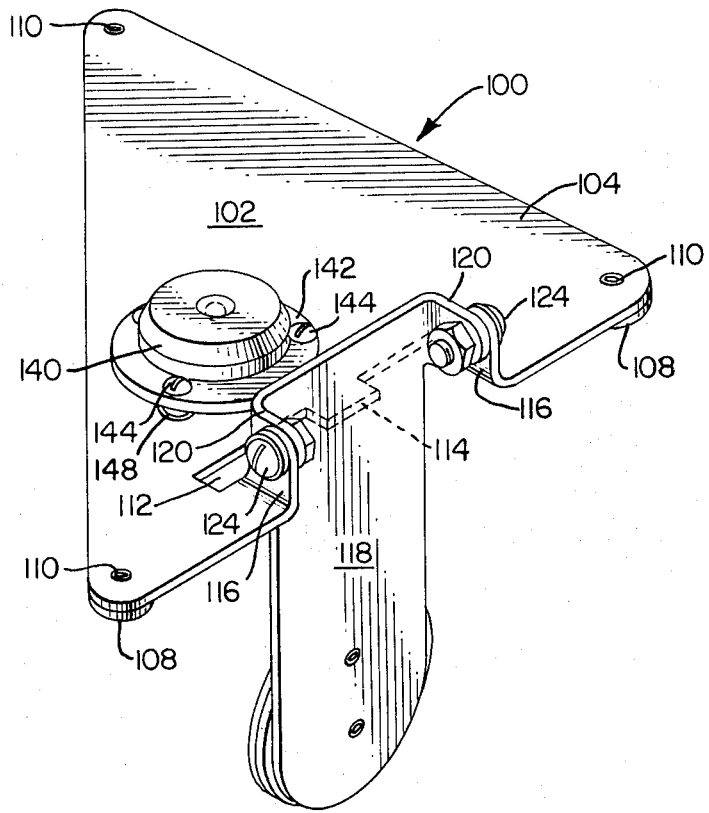
Figure 6:
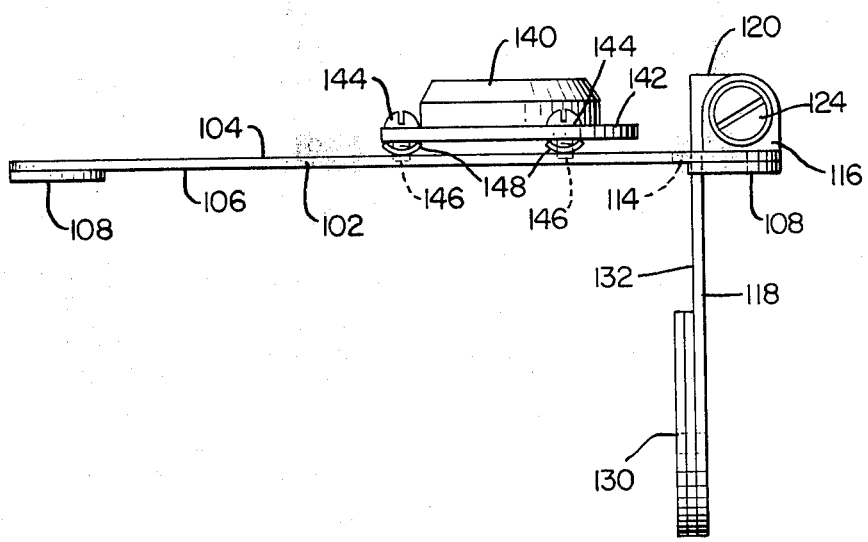

FIG. 3 is a perspective view of a building block set up in vertical position with the level indicating device mounted on the block, FIG. 4 is a perspective view of a wall of building blocks illustrating the position of the level indicating device when the block is being laid on the wall, FIG. 5 is a perspective view illustrating a second embodiment of the block laying level indicating device of this invention, and FIG. 6 is an end elevational view of the device illustrated in FIG. 5.

DETAILED DESCRIPTION OF THE INVENTION

Figure 1:
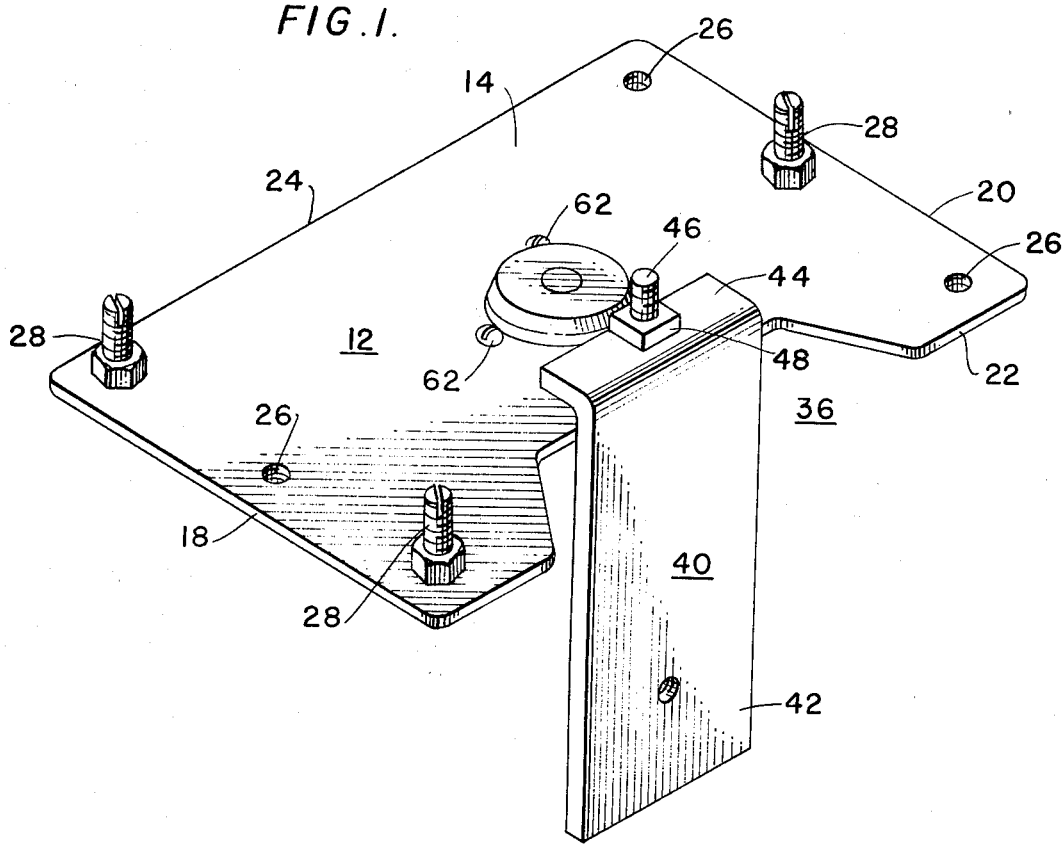
FIG. 1 is a perspective view illustrating a first embodiment of the block laying level indicating device of this invention.
Figure 2:
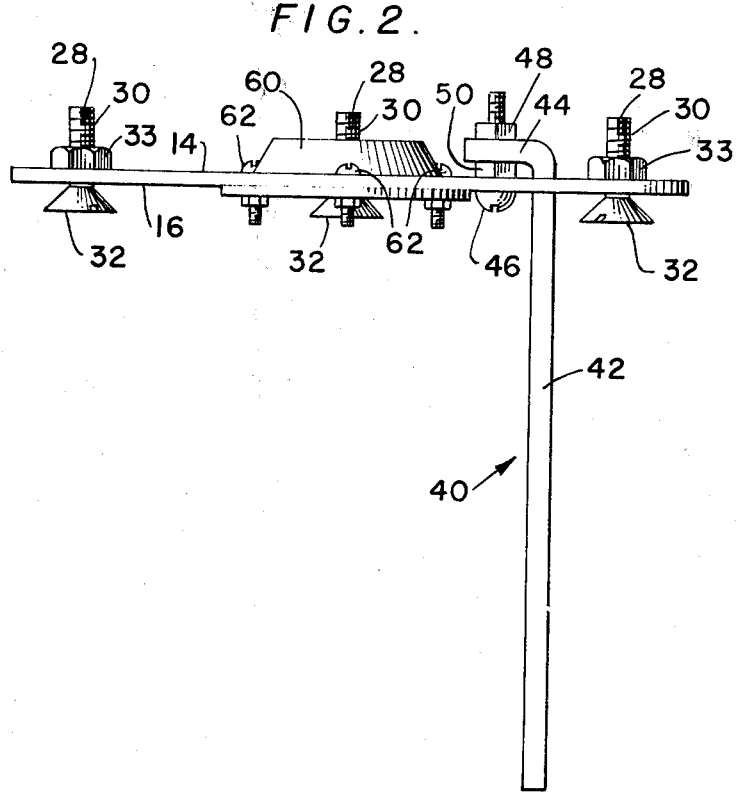
FIG. 2 is an end elevational view of the device shown in FIG. 1.

As best illustrated in FIGS. 1 and 2, the building block laying level indicating device 10 comprises a planar metal base 12 of generally rectangular configuration having a thickness such that the base will be completely rigid and substantially rugged. The base 12 has a top 14, a bottom 16, side edges 18 and 20 and front and back sides 22 and 24, respectively.

The base 12 is provided with a plurality of holes 26 along and adjacent side edges 18 and 20. These holes 26 are threaded to receive threaded adjustable support members 28. More particularly, each support member 28 comprises a threaded body portion 30 with an enlarged head 32 on the lower end thereof. The body portion 30 is threaded into hole 26 and then a lock nut 34 is threaded onto the body 30 to retain the support in desired position on the base 12.

The front side 22 of the base 12 is provided with an inset or cutout producing a somewhat U-shaped opening 36 in the base 12. A positioning member 40 is carried in this U-shaped opening 36 and comprises a downwardly extending leg 42 which is generally perpendicular to the base 12. The upper end of the leg 42 is provided with a flange 44 which extends perpendicularly outward from said leg. The flange 44 is apertured for alignment with a hole in the base whereby the positioning member 40 may be secured to the base in the U-shaped opening 36 by means of bolt 46 and nut 48. A lock nut 50 may be interposed between the flange 44 and base 12 on bolt 46 to maintain the bolt in fixed position on the base 12.

A level indicating device 60 in the form of the well known "Bull's Eye Level" is centrally positioned on the upper face 14 of the base 12 by means of a plurality of bolt and nut assemblies 62.

The building block laying level indicating device of this invention is particularly adapted for use with a conventional building block 70 (see FIG. 3) having a top 72, a bottom 74, front and rear walls 76 and 78, respectively, and end faces 80 and 82. The front and rear walls 76 and 78 are connected by webs 84 and 86 to form three holes 88, 90 and 92 extending vertically through the block.

As is customary when laying building blocks of the size shown in FIG. 3, the first step, after placing mortar on the wall area which receives the block, is to set the block 70 in an upright position as illustrated in FIG. 3 whereby the end which is to receive the mortar is exposed. In this instance such surface is end face 80. With the block in this upright position, the level indicating device 10 is placed in position on the block 70 by introducing the positioning member 40 into the block hole 90 until the adjustable supports 28 engage the block top 72 with the positioning member 80 resting on the block web 86. The length and weight of positioning member 40 is great enough to assure that the adjustable supports 28 will remain in contact with the block top 72 while the block is in the upright vertical position.

After the level device 10 has been positioned on the block, mortar is applied to end 80 and then the block 70 is picked up by gripping the top portion of ends 80 and 82 and is next laid on the wall 100 having mortar joint 102 as indicated in FIG. 4. The weight of the positioning member 40 is such that it will assure that the three adjustable supports 28 are held flush against the top 72 of the block 70 whereby the person laying the block may visually observe level 60 and properly position the block on the wall 100. After the block is laid and its position verified by observing the level 60, the device 10 may be removed.

The interesting facts about levelling device 10 are that once the adjustable supports 28 are properly adjusted to produce a level reading on level 60 no further adjustment is necessary. Additionally, the device 10 is readily inserted and removed from the building block hence it is quite easy to use. The fact that the device does not need continual adjustment plus the fact that it is not attached to the block and fits readily onto the standard block laying routine is of great importance.

A second embodiment of this invention is shown in FIGS. 5 and 6. As illustrated, the device 100 comprises a triangular planar metal base 102 having a thickness as required for the necessary rigidity. The base 102 has a top 104 and a bottom 106 with a fixed support member 108 at each corner of the base, said support members being attached thereto by means of rivets 110.

One side of the triangular base 102 is provided with a cutout portion 112 and has a stop member 114 extending outwardly from said base 102 with the cutout 112. A pair of upstanding ears 116 extends from the base 102 on opposing sides of the cutout 112. A positioning member 118 is pivotally carried by the ears 116. More particularly, positioning member arms 120 on the upper end of said positioning member 118 are fastened to ears 116 by means of a bolt and nut combination 124 wherein the bolt passes through aligned apertures in the respective ears 116 and arms 120. The lower end of the positioning member 118 is provided with a weight member 130 for purposes to be described later.

It should be noted that arms 120 provide sufficient horizontal offset whereby when the inside surface 132 of the positioning member abuts against stop 114 the included angle between the base 102 and the positioning member 118 will be 90°.

In contrast to the embodiment of FIGS. 1 and 2, the adjustability in the second embodiment is formed in the manner in which the level indicating device 140 is mounted in the base upper face 104. Here too, the level indicating device 140 is of the well known "Bull's Eye" type. More specifically, the level indicating device 140 is provided with a circular rim 142 mounting three equidistantly placed screws 144 which threadedly engage appropriately positioned threaded holes 146 in the base 102. Curved washers 148 are interposed between the base top 104 and the underside of the rim 142 by fitting over the screws 144. Since the base supports 108 are fixed to the base 102, the adjustability for levelling the base 102 with respect to the levelling device 140 is provided by the aforementioned curved washers 148 which are flexible and by means of screws 144 make it possible to vary the position of said levelling device with respect to the base. Generally speaking this adjusting need only be done one time. Even so, it is advisable from time to time to check the relationship of the base with respect to the levelling device in order to assure proper use of the device.

As previously set forth, the positioning member 118 is hingedly mounted on ears 116 and abuts against stop 114 to obtain the right angle relationship with the base 102.

It should be noted that the positioning member 118 may be pivoted in a counter clockwise manner, when referring to FIGS. 5 and 6, so that said positioning member will extend over the level indicating device 140 to provide protection for same and further make a very neat unit for storage purposes.

The second embodiment of this invention as shown in FIGS. 5 and 6 is used in identical manner to the embodiment illustrated in FIGS. 1 and 2 and therefore such description will not be repeated.

I claim:

1. A block laying level indicating device adapted for use with a building block of general rectangular configuration having a top and a bottom face, front and rear walls, and opposing end faces, said front and rear walls being connected by webs spaced from each other to provide a plurality of holes extending from the top through the bottom faces, said device comprising:

a planar base;

a plurality of support members on said planar base, said support members being adapted to bear against the top face of the block on which the device is mounted;

level detecting means on said planar base for visually indicating the complete horizontal level position of the block on which the device is mounted when the block is laid; and a positioning member connected to the planar base and extending perpendicularly and downwardly therefrom, said positioning member having an inside face forming the 90° angle between the planar base and the positioning member and an opposite outside face, said positioning member having a length and weight such that when the block is placed in a vertical position with one of the end faces directed upwardly and the device is placed on the block by inserting the positioning member into one of the block holes until the support members bear against the top of the block and the outside face of the positioning member bears upon the block web forming the hole, said planar base will be maintained in position with the support members engaging the top face of the block thus orienting the planar base in a vertical plane and the positioning member in a horizontal plane.

2. The invention as set forth in claim 1 and wherein the planar base is a rectangular plate having an inset wherein the positioning member is affixed to the plate.

3. The invention as set forth in claim 2 and wherein the plurality of support members comprise three screw members threadably carried in the plate for adjustably positioning the plate in a level manner prior to use in block levelling.

4. The invention as set forth in claim 1 and wherein the planar base is a triangular plate having an inset wherein the positioning member is affixed to the plate.

5. The invention as set forth in claim 4 and wherein the plurality of support members comprise a fixed support on each corner of the triangular base.

6. The invention as set forth in claim 4 and wherein the positioning member is hingedly carried in the inset of the triangular base and stop means are provided on the base to provide perpendicular orientation of the positioning member with respect to the base.

7. The invention as set forth in claim 1 and wherein the level detecting means comprises a "Bull's Eye" level device for complete level indication.

* * * * *